United States Patent [19]

Goldberg et al.

[11] Patent Number: 5,692,213
[45] Date of Patent: Nov. 25, 1997

[54] METHOD FOR CONTROLLING REAL-TIME PRESENTATION OF AUDIO/VISUAL DATA ON A COMPUTER SYSTEM

[75] Inventors: David Goldberg, Palo Alto; David A. Nichols, Mountain View; Scott L. Minneman, San Francisco; Steve R. Harrison, Portola Valley, all of Calif.

[73] Assignee: Xerox Corporation, Stamford, Conn.

[21] Appl. No.: 543,520

[22] Filed: Oct. 16, 1995

Related U.S. Application Data

[63] Continuation of Ser. No. 169,905, Dec. 20, 1993, abandoned.

[51] Int. Cl.[6] .................................................. G06T 13/00
[52] U.S. Cl. ..................... 395/806; 395/807; 395/329; 395/330
[58] Field of Search ................................. 395/152–155, 395/806, 807, 173, 329, 330, 331; 345/119; 360/8; 364/514, 514 R, 514 A; 358/342, 312, 313, 320, 346; 348/13, 14, 15

[56] References Cited

U.S. PATENT DOCUMENTS

| 4,301,480 | 11/1981 | Kitamura | 360/8 |
|---|---|---|---|
| 4,864,428 | 9/1989 | Kanamaru | 358/342 |
| 5,148,154 | 9/1992 | Mackay et al. | 345/119 |
| 5,307,456 | 4/1994 | Mackay | 395/154 |
| 5,313,408 | 5/1994 | Goto | 364/514 |
| 5,483,468 | 1/1996 | Chen et al. | 364/551.01 |

OTHER PUBLICATIONS

Foley et al., *Computer Graphics: Principles and Practice*, Second Edition, 1990, pp. 1057–1060.
SpeechSkimmer: Interactively Skimming Recorded Speech, Barry Arons, Nov. 3–5, 1993, UIST93, pp. 187–196.
Press release distributed on an electronic network. Business Editors—Computer Writers.

*Primary Examiner*—Mark K. Zimmerman
*Assistant Examiner*—Stephen Hong
*Attorney, Agent, or Firm*—Townsend and Townsend and Crew LLP

[57] ABSTRACT

A method of recording a real-time multimedia presentation and replaying a missed portion at an accelerated rate until the missed portion catches up to the current point in the presentation. The multimedia presentation may consist of audio, video, graphics, and text. A graphical timeline is provided to allow the user easy access to different points in the recorded presentation. All the media formats are synchronized at the accelerated rate and the audio is accelerated without changing its pitch.

25 Claims, 4 Drawing Sheets

METHOD FOR CONTROLLING REAL-TIME PRESENTATION OF AUDIO/VISUAL DATA ON A COMPUTER SYSTEM

This is a Continuation of application Ser. No. 08/169,905, filed Dec. 20, 1993, now abandoned.

BACKGROUND OF THE INVENTION

The present invention relates generally to ways of viewing audio/video information and more specifically to the accelerated replay of a multimedia real-time presentation.

Multimedia is the combination of text, graphics, and sound in a way that is interactive with the user. Because of the large volume of information that is needed to put on a multimedia presentation, multimedia computers generally require a fast microprocessor, large amounts of memory, and a high resolution monitor. As computer prices continue to fall while performance increases, multimedia is becoming more and more accessible both at home and in the workplace. Thus, audio and video are fast becoming standard datatypes in workstation environments.

Multimedia presentations may be stored on a fixed media such as compact disk-read only memory (CD-ROM) or they can be displayed in real-time (i.e. live as in a teleconference meeting). Storage on a fixed media provides the user with convenient control to stop and replay portions of the presentation in the event something was missed. However, real-time presentations make viewing missed information difficult because the user cannot view the missed portion except by recording it and viewing it later out of sequence. It is also desirable to allow a user to peruse and join a real-time presentation in progress.

SUMMARY OF THE INVENTION

The present invention solves two problems that can occur with live-transmission multimedia presentations. The first problem arises when a person is viewing the meeting from the beginning and wants to go back to review something while the meeting is in progress without missing anything. A second problem is where a person wants to join a meeting in progress and needs to be brought up-to-date with what has already transpired.

To solve these problems, the present invention provides for a portion of a live multimedia presentation to be recorded and played back at an accelerated speed until the user catches up to the real-time presentation. The ability to record a presentation and play it back while the presentation is still in progress also allows a user to peruse and "join" a meeting already going on. When a portion of a multimedia presentation is missed, the present invention allows the user to return to the starting point of the missed information and begin watching the information at an accelerated rate until the user catches up to the real-time presentation. Although the audio and video are accelerated, they still remain intelligible to the user. The audio is accelerated by techniques including speech compression algorithms that retain the pitch of the audio in the accelerated format. The video is then compressed by removing frame images such that it is synchronized with the accelerated audio. While the user is watching the recorded information, the user is obviously missing more of the multimedia presentation. Thus, the present invention is simultaneously recording during accelerated playback so the user does not miss any information.

A preferred embodiment includes software executing on a computer system. The computer system includes a processor, storage area, output device, and user input device. The method includes the steps of: recording a portion of a real-time multimedia presentation, playing the recorded portion back at a synchronized accelerated rate while simultaneously recording the real-time presentation, and resuming normal speed display of the presentation when the accelerated playback catches up to the real-time presentation. Preferably, the invention includes a graphical timeline to enable the user to more easily select the point to resume playback.

A further understanding of the nature and advantages of the invention may be realized by reference to the following portions of the specification and drawings.

DESCRIPTION OF THE PREFERRED EMBODIMENT

The present invention operates on any computer that is able to display and record multimedia presentations; no additional hardware is required. As will be evident from the discussion that follows, however, the computer must be able to display stored multimedia information in an accelerated format while simultaneously recording live multimedia information. In the preferred embodiment, a Sun SPARC workstation running UNIX on an ethernet network, a Sun DIME board, and the Sun MAK++ software toolkit are used to implement the invention. This invention takes advantage of the property of UNIX files that allow the contents of the files to be accessed while they are being written.

Figure 1:
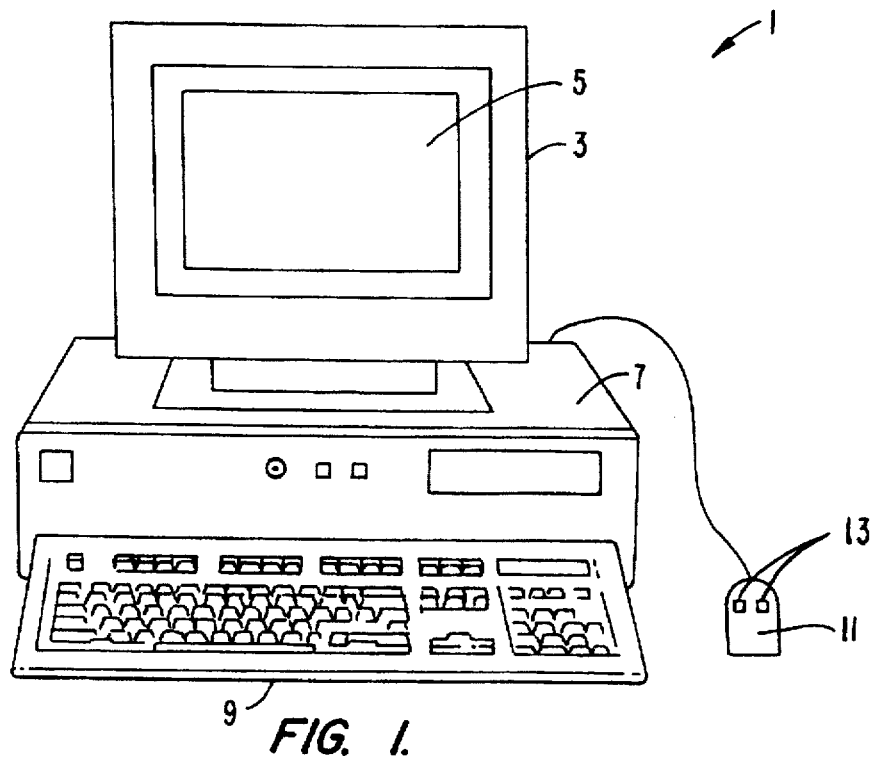
FIG. 1 illustrates an example of a computer system used to execute the software of the present invention.

FIG. 1 shows an example of a computer system used to execute the software of the present invention. FIG. 1 shows computer system 1 which includes display unit 3, display screen 5, cabinet 7, keyboard 9, and mouse 11. Mouse 11 may have one or more buttons such as mouse buttons 13. Cabinet 7 houses familiar computer components (not shown) such as a processor, memory, disk drives, etc. Computer system 1 has to receive a real-time multimedia presentation so external hardware components have to be connected to it. These external hardware components also interface with computer system 1 within cabinet 7.

Figure 2:
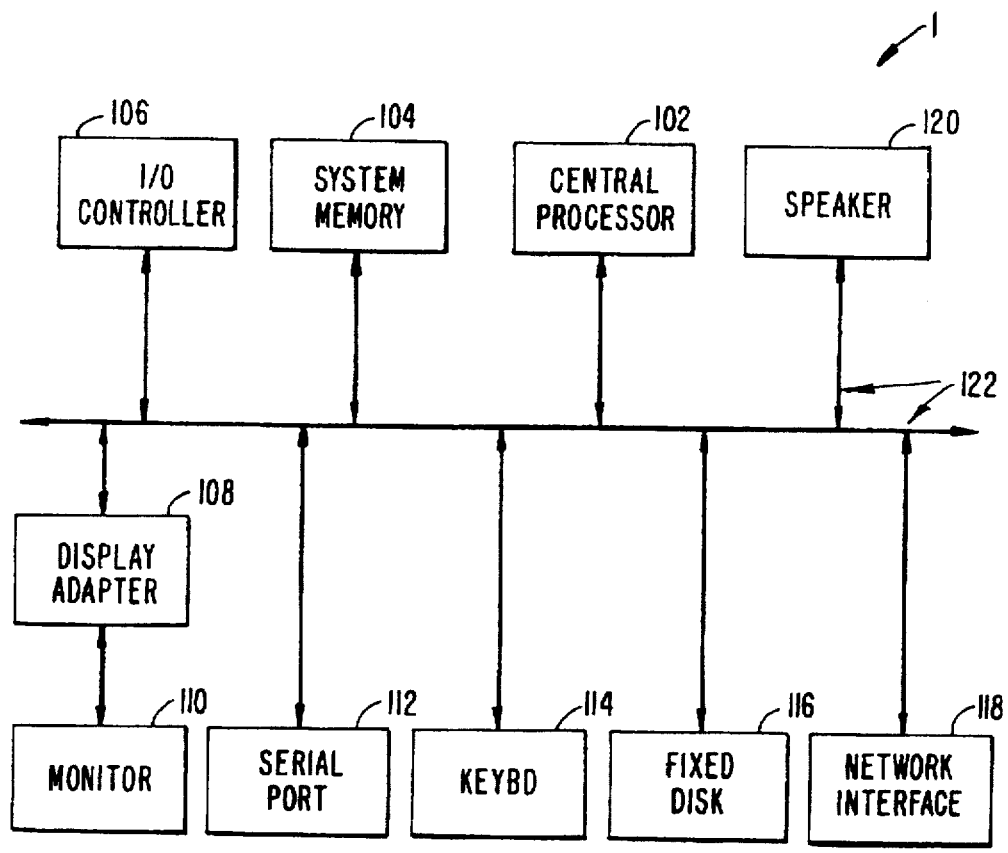
FIG. 2 shows a system block diagram of a typical computer system used to execute the software of the present invention.

FIG. 2 is a system block diagram of computer system 1 used to execute the software of the present invention. Computer system 1 includes subsystems such as processor 102, memory 104, I/O controller 106, display adapter 108, monitor 110, serial port 112, keyboard 114, fixed disk 116, network interface 118, and speaker 120. Other computer systems suitable for use with the present invention may include additional or fewer subsystems. For example, another computer system could include more than one processor 102 (i.e., a multi-processor system). Or, a system may include a cache memory.

Arrows such as 122 represent the system bus architecture of computer system 1. However, these arrows are illustrative of any interconnection scheme serving to link the subsystems. For example, speaker 120 could be connected to the other subsystems through a port or have an internal direct connection to central processor 102. In the preferred embodiment, the computer system 1 receives the real-time multimedia presentation, and stored presentation data through network interface 118.

Computer system 1 shown in FIG. 2 is but an example of a computer system suitable for use with the present invention. Other configurations of subsystems suitable for use with the present invention will be readily apparent to one of skill in the art.

Figure 3:
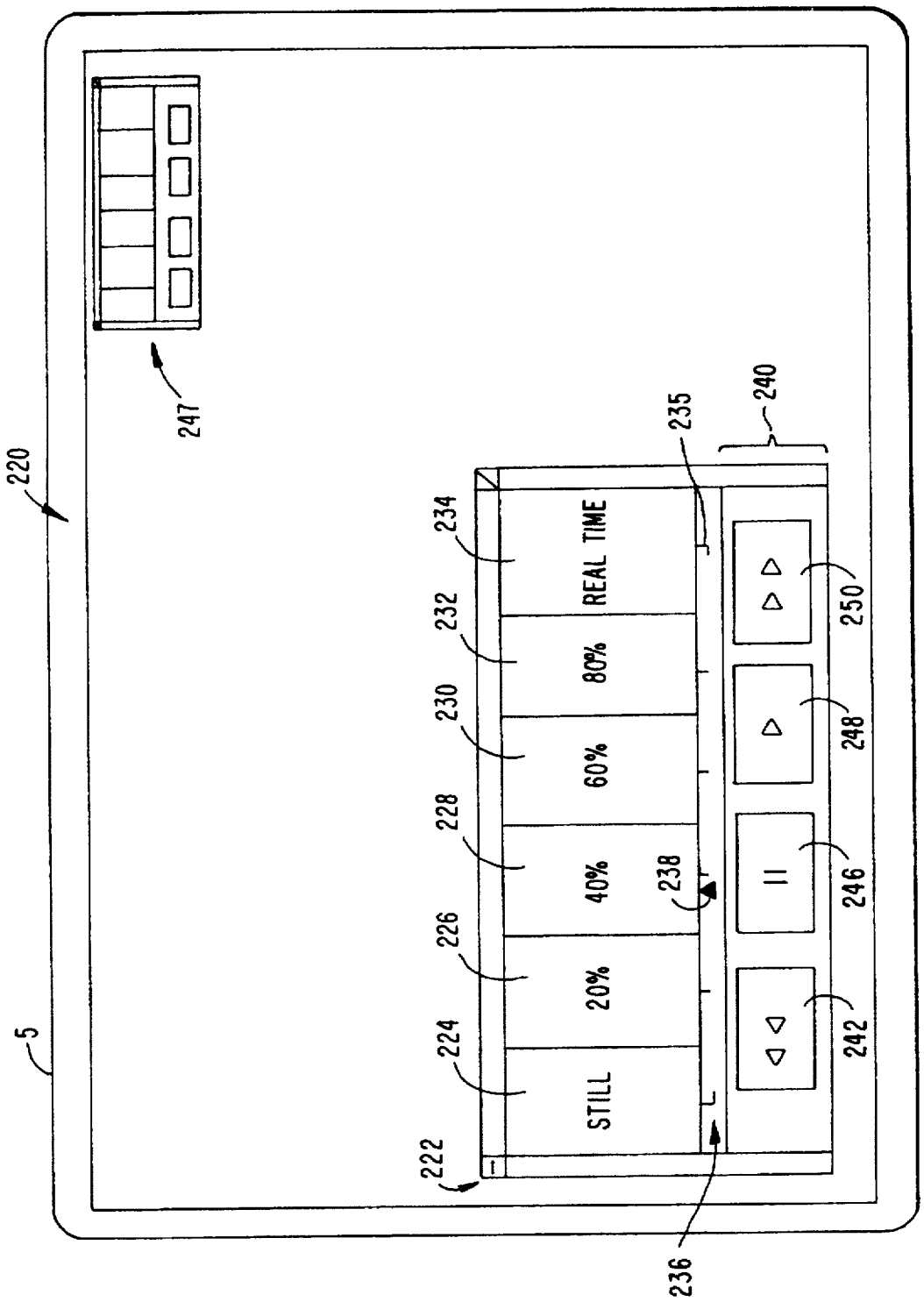
FIG. 3 shows a screen display illustrating the user interface of the present invention.

FIG. 3 shows display screen 5 illustrating a screen display 220 of the user interface of the present invention. In general, the layout and functionality of the screens described herein are intended not to limit the invention to that specific implementation. Multimedia presentations may consist of audio and video including sound, picture images, graphics, and text. The screen display 220 is the area in which the video output is displayed.

Inset window 222 includes the controls of the user interface of the present invention. As with all windows in a windowing operating system, inset window 222 may be resized. During normal operation, inset window 222 would be "shrunk" to about the size shown at 247 so as to exist unobtrusively while the video image is displayed in screen display 220. The video image is, itself, shown in a window that may be resized so that multiple video windows and control panels in inset windows (not shown) can appear on screen display 220 at once. Although the present invention is shown in a windowing environment, it would also work in other environments.

Window 222 includes a control panel 240 that provides a number of controls similar to the controls that are found on a television video cassette recorder (VCR). They include rewind 242, pause 246, play 248, and fast-forward 250. These controls function in substantially the same way as on a VCR and the user operates them by "clicking" on them with a mouse or by any other computer user input device. During a real-time presentation, if the user clicks pause 246 a pause mode is entered where the screen image is stopped or "frozen" and the audio suppressed while the presentation is recorded.

Figure 6:
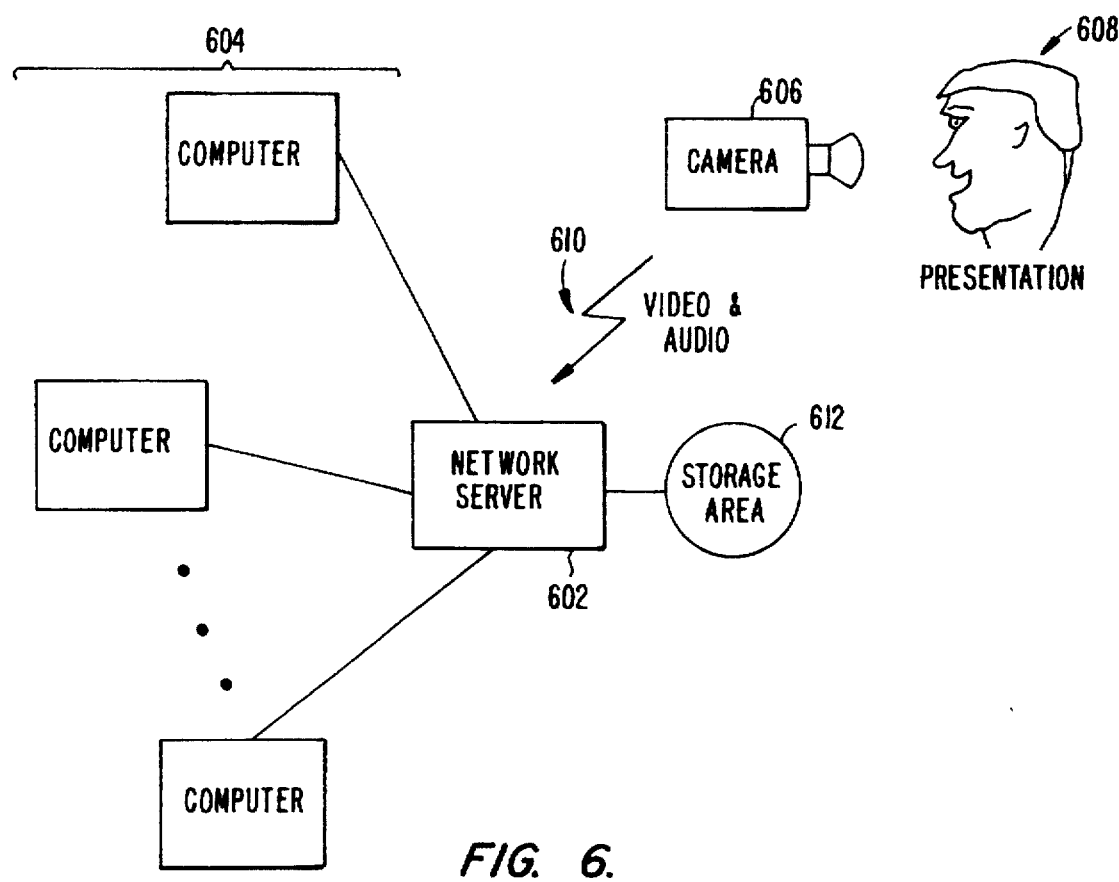
FIG. 6 shows a preferred embodiment of the invention in which multiple computers are connected to a computer network.

FIG. 6 shows a preferred embodiment of the invention in which multiple computers are connected to a computer network. The network is maintained by centralized server 602 that is a shared resource connected to remote computers 604 on the network. The network can be implemented by any means that is known in the art. Camera 606 is used to capture multimedia presentation 608. Multimedia presentation can consist of video images, computer graphics, speech, music, etc. The presentation is converted into electronic signals 610, transferred to network server 602 and stored in storage area 612. Once stored, each computer 604 can access the stored presentation independently and simultaneously as described herein. A preferred format for storing and retrieving the presentation is the UNIX file format. This format allows for multiple different read points in a stored file and for simultaneous read/write of a shared file from an operating system viewpoint. See "The Design of the UNIX Operating System," by Maurice J. Bach, Prentice Hall 1986.

FIG. 6 shows a network implementation of the present invention. The invention can also be implemented as a standalone system where storage area areas such as storage area 612 are connected directly to each of computers 604. In the standalone implementation (not shown), control area 240 of FIG. 3 would include a "record" button to allow the user to selectively begin recording a desired multimedia presentation. The "record" button is not necessary for the network implementation of the invention since every multimedia presentation is automatically recorded. The reason that a user in the standalone scheme may not want to record the presentation is because of the large amount of local storage that it takes to store the presentation. This is typically not a problem for a storage area connected to a network server since the storage area is shared and is usually large. Other means of allowing selective storing of a multimedia presentation are possible.

In FIG. 3, window 222 includes a number of keyframes to help the user access different portions of the recorded presentation. The recorded portion may be accessed while recording is still in progress. Keyframes 224, 226, 228, 230, 232, and 234 form a storyboard that represents the video images that were displayed at different points in time of the recording. Keyframe 224 represents the frame, or screen image, that was being shown when recording began. Keyframe 226 shows the frame 20% "into" the recording buffer. Likewise keyframes 228, 230, and 232 show the frames at 40%, 60%, and 80% into the storage area, or recording buffer, respectively. Keyframe 234 shows the current screen image of the real-time presentation, that is, a real-time display of what is happening in the presentation at the moment. While FIG. 3 shows each keyframe labelled as, for example, "still," "20%," "40%," in practice, each keyframe will display an image from the recorded video. If, for example, the presentation is a lecture, each keyframe will show one or more speakers, a close up of a visual aid used in the lecture, etc.

Keyframe 224 always shows the point where recording began and does not change. As the buffer stores more screen images, however, keyframes 226, 228, 230, 232, and 234 change. The rate at which each keyframe changes is proportional to its currency. Thus, the display rate of keyframe 226 is 20% of keyframe 234, which is changing at real-time speed.

Window 222 also includes a timeline 236 with an indicator 238. Timeline 236 is a timeline of the recorded portion of the presentation in the buffer and corresponds to the keyframes that are above it. Indicator 238 is an icon that specifies the point in the recorded presentation where replaying will begin when the user clicks play 248. In the preferred embodiment, the portion of screen 220 outside window 222 shows the screen image specified by indicator 238. In this way, the user is able to pinpoint the precise point in the recording to begin playback. The user is able to move indicator 238 along timeline 236 using a user input device. This may be implemented a number of ways including using the rewind and fast-forward buttons 242 and 250, respectively, of FIG. 3 or using a mouse to "drag" indicator 238 along timeline 236.

The present invention replays a recorded multimedia presentation at up to two (2) times its normal speed while maintaining synchronization of video and audio so that the user can "catch up" with the live, real-time presentation in progress. Faster rates of playback are possible without synchronization as explained below. The rate of playback may be specified by the user in any of a number of ways including typing in a number from the keyboard, using the mouse to manipulate a knob or slider (not shown), etc.

There are limits to how much a presentation can be accelerated and still be intelligible to the user. The replay speed is limited primarily by the intelligibility of audio acceleration and not the video acceleration. The present invention can accelerate the video or image data playback well beyond a 2 times rate increase by merely removing more frame images. These rates still make sense to the viewer since the human mind can absorb visual information at a fast rate. In order to provide some audio cues with the faster video rate, a technique is used whereby less than all of the audible information is attempted to be conveyed to the user.

The audio is broken down into segments determined by the pauses between speech. Each audio segment is replayed at the maximum intelligible rate (e.g., twice as fast as normal) until the video being displayed corresponds to the next audio segment. As an example, an audio segment is played at twice the normal audio speed while the video is played back at faster than twice the video speed. The audio segment is stopped when the video playback reaches the end of the segment (e.g., the end of a sentence) as determined by the breaks in speech, whereupon the next audio segment is begun. In this way, only the beginning portions of the accelerated audio are played back. Thus, the audio and video are synchronized only with respect to the beginning of each audio segment. In this way, the user can hear enough of the audio to get the gist of what transpired while the video plays back at a rate not limited by the intelligible speech limitation speedup of about a factor of 2.

Timeline 236 of FIG. 3 can be used to select start and end times for replay. Additionally, the timeline may be augmented by markers, such as marker 235, that indicate other events that the computer system may receive notification about. These events include, for example, the arrival of a participant via badges containing active electronics that are sensed by external hardware. An event can be indicated by a participant via a handheld computer. An event may also be the selection of a new page for a visual presentation in a computer drawing system, the start of an individual's speech as detected by speech processing hardware and/or software, the current time, etc. Additionally, a user may insert their own markers as desired as an aid in locating an area of the presentation later on. The markers can be local or global. That is, global markers are supplied automatically by the server to all users who access the stored presentation. Local markers can be created either automatically or manually by each user's computer, or each user, respectively, but will not be distributed automatically to other users of the network.

In FIG. 3, marker 235 is global and merely indicates the end of the presentation stored so far in the buffer. Other markers illustrated in FIG. 3 show the point at which the keyframe above the marker occurs in the timeline.

Control panels other than that shown in FIG. 3 are possible. By eliminating buttons or keyframes the control panels are made smaller to fit more of them on screen 5 at one time. The display of multiple control panels such as control panel 222 are possible. This corresponds to multiple presentations going on at the same time, each viewable by the user in the manner described herein.

Figure 4:
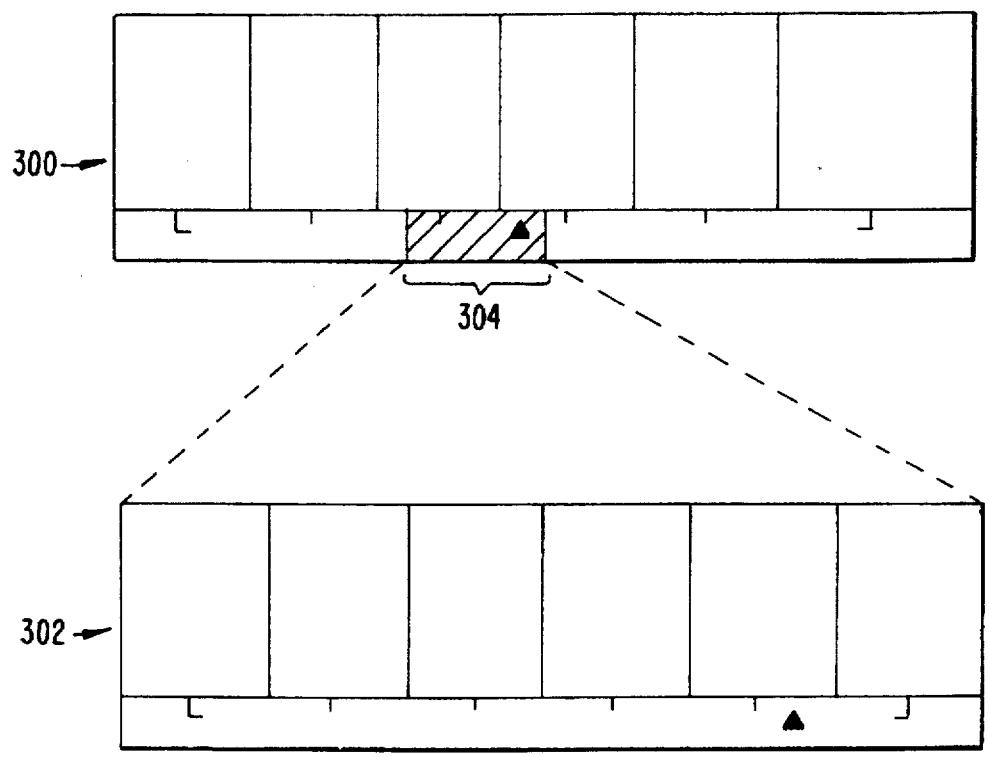
FIG. 4 shows a partial screen display of one embodiment of the present invention.

Another embodiment allows for the timeline to be expanded or "zoomed." This is shown in FIG. 4 where a new set 302 of keyframes, timeline, and indicator would appear to help narrow the search. The new set 302 is an expansion of set 300 specified by time frame region 304.

Figure 5:
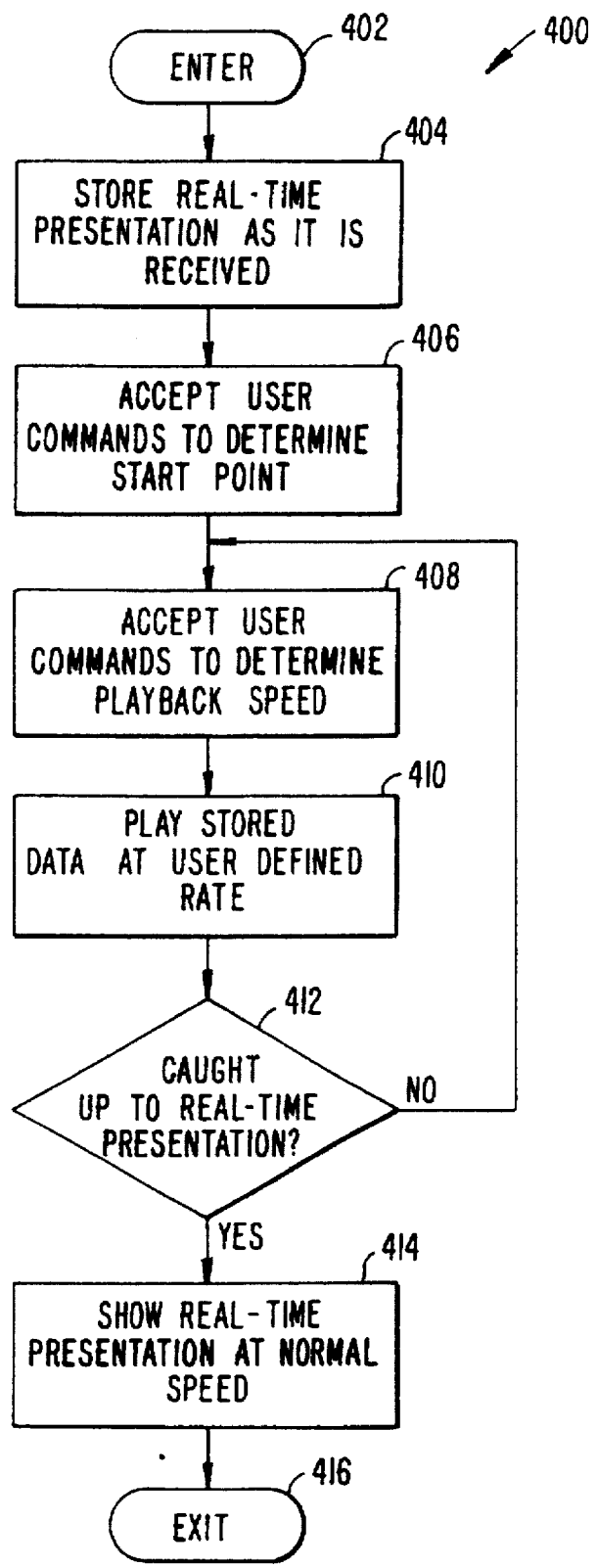
FIG. 5 shows a high level flowchart of the accelerated multimedia replay algorithm of the present invention.

FIG. 5 shows flowchart 400 illustrating the high level logic flow of the accelerated multimedia replay algorithm of the present invention. Flowchart 400 represents one or more software routines executing in a computer system such as computer system 1 of FIG. 1. Flowchart 400 may be implemented by any means as is known in the art. For example, any number of computer programming languages, such as "C", Pascal, FORTRAN, assembly language, etc., may be used. Further, various programming approaches such as procedural or "object oriented" programming, or artificial intelligence techniques, may be employed. The steps of flowchart 400 may be implemented by one or more software routines, processes, subroutines, modules, etc. It will be apparent that flowchart 400 is illustrative of but the broad logical flow of the method of the present invention and that steps may be added to, or taken away from, flowchart 400. For ease of discussion, we will refer to the implementation of flowchart 400 as if it was a single "routine".

The routine of flowchart 400 is entered at step 402. It is assumed that the computer system is receiving a real-time multimedia presentation when the routine of flowchart 400 is entered. In a network application, at step 404, the server is storing the multimedia presentation in a storage area and the user can view the presentation in progress at their computer. While the invention is recording, the user can do other tasks such as attending to documents or answering the phone. The user may even use their computer to perform other tasks while the real-time or accelerated playback is in progress. In the preferred embodiment, the multimedia information is stored off to a hard disk in a compressed format in order to save disk space.

At step 406, the routine accepts user commands to determine a starting point for playback. The user uses controls such as those discussed in inset window 222 of FIG. 3 as discussed above. Similarly, at step 408, the routine accepts user commands to indicate the playback speed.

At step 410, the stored multimedia information is replayed in an accelerated format so the user can "catch up" to the real-time presentation still in progress. During playback, the real-time presentation is simultaneously recorded until the user catches up. In other words, step 404 of flowchart 400 is continuously being executed.

At step 412 a check is made as to whether the playback has caught up to the real-time presentation in progress. If not, execution returns to step 408 where the routine tests whether the user wishes to change the playback speed. The stored audio and image data are continuously played back at the currently selected accelerated speed. When the accelerated playback catches up to the real-time presentation execution proceeds to step 414.

When the accelerated playback catches up to the real-time presentation, step 414 is executed and the invention stops recording the presentation and begins showing the real-time presentation at normal speed. The order of many of the steps in flowchart 400 is arbitrary and can be reversed or done simultaneously. For example, steps 408 and 410 may be interchanged and, in fact, appear simultaneous to the user. Flowchart 400 is exited at step 416.

During accelerated playback the audio, video, text, and graphics, if any, in the multimedia presentation all remain synchronized. The video, text and graphics portions of the multimedia presentation are accelerated by reducing the number of frames that are displayed. Another way to increase the playback of these visual images is to increase the rate at which the frames are displayed, thus allowing all frames to be displayed. Although, in the former method, the smoothness of the display degrades, it is still intelligible to the user.

One way to accelerate the audio playback is by increasing the replay speed; however, the pitch of the voice would change and it would generally become unintelligible even at slightly accelerated rates. An embodiment of the present invention uses voice compression techniques as described in Roucos et al., "High Quality Time-Scale Modification for Speech," IEEE 1985 and Wayman et al., "Some Improvements on the Synchronized-Overlap-Add Method of Time Scale Modification for Use in Real-Time Speech Compression and Noise Filtering," IEEE 1988 which are hereby incorporated by reference as if set forth in full in this specification. By using these voice compression techniques, the audio is sped up in such a way that the speaker's pitch remains unchanged and the user can understand what is being said.

A related function is the ability of the present invention to further accelerate the audio by removing words that have no meaning. Thus, words like "um" and "uh" are recognized and removed.

The present invention slows down the accelerated playback speed automatically when it is close to catching up to the real-time presentation. This provides a very smooth transition from accelerated replay to real-time. In one embodiment, the user can select the rate at which the recorded information is replayed.

In another embodiment, the real-time multimedia presentation is continually stored in a circular buffer that holds a certain amount of information (e.g. the last five minutes of the presentation). The user can then rewind and replay up to five minutes prior to the real-time point. This allows the user the flexibility to watch the real-time presentation and replay a certain portion without missing any information.

While the above is a complete description of the preferred embodiment of the invention, various alternatives, modifications, and equivalents may be used. Therefore, the above description should not be taken as limiting the scope of the invention as defined by the appended claims.

What is claimed is:

1. A method of replaying in an accelerated format a multimedia real-time presentation of audio data and image data on a first computer system, the first computer system including a processor, speaker display device, and user input device, the first computer system coupled to a storage area for storing data, the image data comprising a plurality of frames, the method comprising the steps of:

recording a portion of the presentation into a recording buffer in the storage area, the recording buffer including audio data and image data;

using the processor to accelerate playback of the audio data of the presentation in the recording buffer;

using the processor to accelerate playback of the image data of the presentation in the recording buffer in order to keep the accelerated image data playback synchronized with the accelerated audio data playback;

recording the presentation in progress into the recording buffer during the accelerated playback of the audio and image data in the recording buffer; and presenting the presentation at a normal speed after the presentation in the recording buffer has been played back and the accelerated playback catches up to the real-time multimedia presentation in progress.

2. The method of claim 1, wherein the storage area is in a server system coupled to a computer network, wherein the first computer system and one or more other computer systems are coupled to the network, the method further comprising a step of:

replaying recorded portions of the presentation in the recording buffer in an accelerated format according to the steps of claim 1 in one or more of the other computer systems simultaneously with the accelerated replaying of the presentation in the recording buffer on the first computer system.

3. The method of claim 1, wherein the processor accelerates the playback of the recorded audio data by removing specific words or sounds.

4. The method of claim 1, wherein the rate that the presentation is accelerated is user selectable through said user input device.

5. The method of claim 1, wherein a plurality of keyframes are displayed on the display device which represent frames of the image data recorded at different points in time.

6. The method of claim 5, wherein a first keyframe shows a frame of the image data that is a percentage into the recording buffer and the rate at which the first keyframe changes is approximately equal to the percentage of a real-time rate of the presentation.

7. The method of claim 1, wherein a timeline of the recording buffer is displayed on the display device, wherein said timeline is augmented by markers that indicate events that occurred during the recording.

8. The method of claim 1, wherein the recording buffer is a circular buffer.

9. The method of claim 1, wherein the recorded portion of the presentation stored is limited to a predetermined amount.

10. The method of claim 1, wherein the recorded portion of the presentation may be further accelerated upon request from the user via the user input device by the steps of:

using the processor to compress the image data by reducing a number of frames in the image data that are displayed;

using the processor to break the audio data of the portion into segments determined by pauses in the audio data; and replaying the presentation in the recording buffer in a further accelerated format by displaying the compressed image data on the display device and conveying an initial portion of each audio segment through the speaker.

11. The method of claim 1, wherein the audio and image data in the recording buffer are gradually accelerated less as the accelerated playback of the presentation nears the real-time multimedia presentation in progress, wherein a smooth transition to the real-time presentation is provided.

12. The method of claim 1, wherein the pitch of the accelerated audio data is approximately equal to the pitch of the presentation from which it was recorded.

13. A method of replaying in an accelerated format an audio presentation on a computer system, the computer system including a processor, speaker and user input device, the computer system coupled to a storage area for storing data, the method comprising the steps of:

recording a portion of the presentation into a recording buffer in the storage area, the recording buffer including audio data;

using the processor to accelerate playback of the audio data of the presentation in the recording buffer;

recording the presentation in progress into the recording buffer during the accelerated playback of the audio data in the recording buffer; and presenting the presentation at a normal speed after the presentation in the recording buffer has been played back and the accelerated playback catches up to the audio presentation in progress.

14. The method of claim 13, wherein the pitch of the accelerated audio data is approximately equal to the pitch of the presentation from which it was recorded.

15. An apparatus for replaying a portion of a multimedia real-time presentation of audio and video images in an accelerated format, comprising:

means for receiving the presentation;

means for receiving user input;

means for recording a portion of the presentation, said portion including audio and video images;

processor means for compressing the audio of the recorded portion of the presentation and compressing the video images in order to keep the video images synchronized with the compressed audio; said processor means being coupled to said receiving means, said user input means, and said recording means; and means, coupled to said processor means, for conveying the compressed audio and video;

said recording means recording the presentation in progress while the compressed audio and video are being conveyed until the compressed audio and video catch up to the real-time presentation in progress.

16. The apparatus of claim 15, wherein the pitch of the compressed audio is approximately equal to the pitch of the presentation from which it was recorded.

17. In a computer system, a method of presenting presentations including audio and video, the method comprising the steps of:

receiving a presentation including audio and video;

recording a portion of the presentation into at least one file on a storage device, the at least one file including audio and video;

replaying the audio and video in the at least one file at an accelerated rate while the presentation in progress is being recorded into the at least one file; and presenting the presentation in progress at an unaccelerated rate after the presentation in the at least one file has been replayed and the accelerated replaying of the presentation catches up to the presentation in progress.

18. The method of claim 17, wherein the replaying step includes the steps of:

replaying the audio of the presentation in the at least one file at an accelerated rate; and displaying the video of the presentation in the at least one file synchronized with the accelerated audio.

19. The method of claim 18, wherein the video includes frames and the video is synchronized by displaying less than all of the frames comprising the video.

20. A computer program product for presenting presentations including audio and video, comprising:

code that receives a presentation including audio and video;

code that records a portion of the presentation into at least one file on a storage device, the at least one file including audio and video;

code that replays the audio and video in the at least one file at an accelerated rate while the presentation in progress is being recorded into the at least one file;

code that presents the presentation in progress at an unaccelerated rate after the presentation in the at least one file has been replayed and the accelerated replaying of the presentation catches up to the presentation in progress; and a computer readable medium that stores the codes.

21. The computer program product of claim 20, wherein the computer readable medium is a memory or disk.

22. A computer program product for presenting presentations, comprising:

code that receives a presentation;

code that records a portion of the presentation on a storage device;

code that replays the recorded presentation at an accelerated rate while the presentation in progress is being recorded on the storage device;

code that presents the presentation in progress at an unaccelerated rate once the accelerated replaying of the recorded presentation catches up to the presentation in progress; and a computer readable medium that stores the codes.

23. The computer program product of claim 22, wherein the presentation includes audio and video.

24. The computer program product of claim 23, further comprising code that synchronizes the accelerated replaying of the audio and video in the recorded presentation.

25. The computer program product of claim 22, wherein the computer readable medium is a memory or disk.

* * * * *